C. D. SYMONDS.
BROILER.
No. 189,519. Patented April 10, 1877.
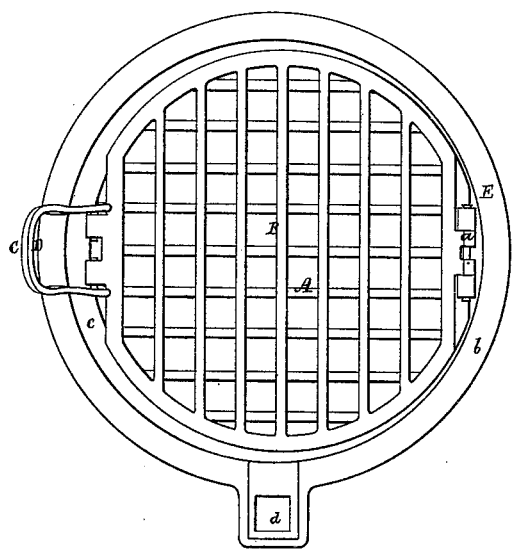
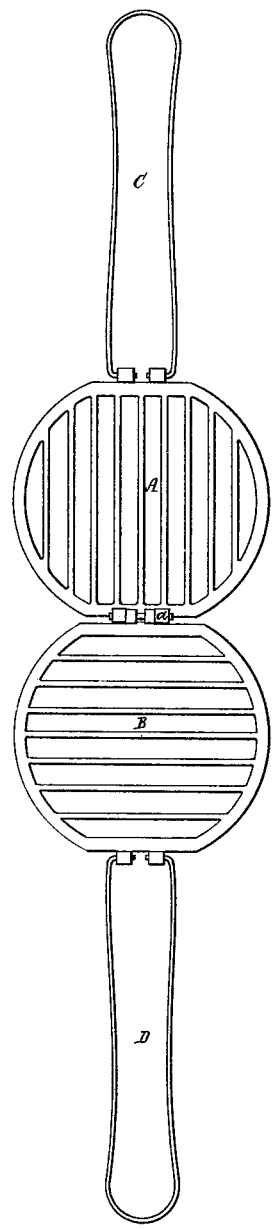
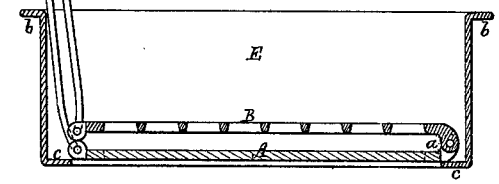

UNITED STATES PATENT OFFICE.

CHARLES D. SYMONDS, OF BOSTON, MASSACHUSETTS.

IMPROVEMENT IN BROILERS.

Specification forming part of Letters Patent No. 189,519, dated April 10, 1877; application filed April 4, 1877.

*To all whom it may concern:*

Be it known that I, CHARLES D. SYMONDS, of Boston, of the county of Suffolk and State of Massachusetts, have invented a new and useful Improvement in Steak-Broilers; and do hereby declare the same to be fully described in the following specification, and represented in the accompanying drawings, of which—

Figure 1 is a top view, and Fig. 2 a transverse section, of a broiler of my improved kind. Fig. 3 is a top view of the grids and their handles as spread open.

My invention relates to the combination of a double-flanged ring with two grids hinged together, and provided with the two handles hinged to them, respectively, all being substantially as represented in the accompanying drawings, and as hereinafter explained.

In such drawings, A and B are the two grids, hinged together, as shown at *a*, and being circular in form, or otherwise properly shaped. Opposite to where the two grids are connected each of them has hinged to it one of a pair of handles, C D, the same being so as to admit of each of the handles being moved through an arc of one hundred and eighty degrees, or thereabout, so as to be brought into, or about into, a right angle with either grid when over the other.

These grids are for use with a deep ring, E, having a flange, *b*, projecting from and around its upper end, and outwardly beyond its exterior periphery. Such ring also is provided with a flange, *c*, projecting inward from its lower edge, and being to support the lowermost of the pair of grids when placed within the ring. The said ring I usually provide with a handle, *d*, projecting from it, as shown.

The ring is to enter and fit to a hole in the top plate of a stove or range, the upper flange of the ring serving, by resting on the said plate, to support the ring over the fire.

By having the handles hinged to the grids the latter may be readily opened apart to receive a piece of meat, and afterward be closed upon it, and with it be introduced within the ring, the handles standing upright when the grids are in the ring, so by means of the handles the grids can be raised out of the ring, and turned over, and again introduced into it as often as occasion may require in cooking the meat.

The bars of one grid I usually dispose in directions at right angles to those of the other, as shown; but I do not confine my invention to such an arrangement of them.

In the arrangement of the handles and the two grids, the bars of one grid are disposed at right angles to those of the other, instead of being parallel when the broiler is either open or closed. The said arrangement enables meat to be cooked by the broiler to better advantage than it can be were the bars of one grid directly opposite to and parallel with those of the other, for in this latter case, the meat, when held by the grids, becomes squeezed in lines or ranges; but when the bars of one grid are at right angles with or cross those of the other, when the grids are closed, the meat is not only held more evenly, but the heat has better access to it for cooking it.

Furthermore, when the grids are closed either way together, the handles fold directly upon one another, so as to be capable of being simultaneously grasped by one hand, and turned or moved, as occasion may require.

A steak-broiler so made has been found in practice to be highly useful and efficient.

I claim as my invention—

The combination of the double-flanged ring E, as described, with the two grids A B and the two handles C D, all arranged and connected together substantially as shown and explained.

CHARLES D. SYMONDS.

Witnesses:
R. H. EDDY,
J. R. SNOW.